US006485818B2

(12) United States Patent
Fujita

(10) Patent No.: US 6,485,818 B2
(45) Date of Patent: *Nov. 26, 2002

(54) POLYESTER FILM FOR IMAGING MEDIA

(75) Inventor: Masato Fujita, Shiga-ken (JP)

(73) Assignee: Mitsubishi Polyester Film Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,441

(22) Filed: Apr. 26, 1999

(65) Prior Publication Data

US 2002/0061394 A1 May 23, 2002

(30) Foreign Application Priority Data

Apr. 27, 1998 (JP) .......................... 10-116482

(51) Int. Cl.$^7$ .................. B32B 27/08; B32B 27/30; B32B 27/36; B32B 33/00
(52) U.S. Cl. ................ 428/220; 428/323; 428/336; 428/482; 428/483; 428/910
(58) Field of Search ............... 428/482, 483, 428/323, 910, 220, 336

(56) References Cited

U.S. PATENT DOCUMENTS 4,388,375 A 6/1983 Hopper et al. .......... 428/423.7
4,526,847 A * 7/1985 Walker et al. ............ 430/18
4,824,725 A * 4/1989 Thoese ................... 428/336

FOREIGN PATENT DOCUMENTS

EP 0 835 752 A2 4/1998
EP 0 911 152 A2 4/1999

OTHER PUBLICATIONS

Alger, Mark, Polymer Science Dictionary, 2nd Edition, p. 42, Jan. 1997.*

Copy of European Patent Office (EPO) Search Report for International application No. EP 99 10 8100, issued on Nov. 15, 2001, (2) pages.

* cited by examiner

Primary Examiner—Stevan A. Resan
Assistant Examiner—Ramsey Zachara
(74) Attorney, Agent, or Firm—Edwards & Angell, LLP; David G. Conlin; Richard J. Roos

(57) ABSTRACT

The present invention relates to a primer coated polyester film for imaging media which has a thickness of 40 to 200 μm, a haze of not more than 5%, and comprises a biaxially oriented polyester film support and at least one priming layer laminated on the support and oriented at least monoaxially. The priming layer is formed from a coating solution containing a water-soluble resin (A) having vinyl alcohol units as a main constituent and a water-soluble or water-despersible resin (B) having an aromatic polyester unit.

4 Claims, No Drawings

POLYESTER FILM FOR IMAGING MEDIA

BACKGROUND OF THE INVENTION

The present invention relates to a transparent polyester film for the imaging media. More particularly, it relates to a transparent primer-coated polyester film for the imaging media which has a priming layer formed by coating a resin on at least one side of a biaxially oriented polyester film, and which has high-degree transparency and adhesion, particularly high adhesion to the functional layers mainly made of a water-soluble or hydrophilic resin such as polyvinyl alcohol.

Polyester films such as polyethylene terephthalate (PET) and polyethylene naphthalate (PEN) are used as support films for a variety of purposes owing to their excellence in many properties such as mechanical strength, dimensional stability, flatness, heat resistance, chemical resistance and optical properties, in addition to their high cost performance.

These polyester films, however, have disadvantages in which their cohesive force is strong due to their chemical properties and crystallized film surface, and are therefore low in adhesion to the functional layers in various uses. In order to eliminate such disadvantages, various methods and techniques have been proposed, such as laminating a low-crystallizability polyester layer on the surface of a polyester film by means of coextrusion, or coating a water-dispersible polyester or acrylic resin as a primer on a base polyester film (Japanese Patent Publication (KOKOKU) No. 49-10243, Japanese Patent Application Laid-Open (KOKAI) Nos. 52-19786, 52-19787, 54-43017, etc.).

Thus, although the techniques using a support film comprising a polyester or acrylic resin as a primer have been developed, any of these films has been unsatisfactory in adhesion to the functional layers mainly made of a water-soluble or hydrophilic resin such as polyvinyl alcohol.

As a result of the present inventor's earnest studies to solve the above problem, it has been found that by providing a priming layer (offering satisfactory adhesion to aqueous coating) on a polyester film support by coating its surface with a coating solution of a specific composition, the above problem can be solved.

The present invention has been attained on the basis of the above finding.

SUMMARY OF THE INVENTION

The object of the present invention is to provide a transparent polyester film for imaging media which has a priming layer (primer coated layer) with particularly high adhesion to the functional layers mainly comprising a water-soluble or hydrophilic resin such as polyvinyl alcohol, for example, the ink image receiving layer in ink jet printing which has become widely used in recent years, and the functional layers mainly comprising a water-soluble or hydrophilic resins such as gelatin, for example, sensitive photographic films, and which is also excellent in transparency and flatness.

To attain the above aim, in an aspect of the present invention, there is provided a primer coated polyester film for imaging media, which has a thickness of 40 to 200 $\mu$m and a haze of not more than 5%, and comprises a biaxially oriented polyester film support and at least one a priming layer laminated on said support and oriented at least monoaxially, said priming layer being formed from a coating solution containing a water-soluble resin (A) having the vinyl alcohol units as main constituent and a water-soluble or water-dispersible resin (B) having an aromatic polyester unit.

DETAILED DESCRIPTION OF THE INVENTION

The present invention is described in more detail.

The polyesters usable in the present invention as biaxially oriented polyester film support include, for example, polyethylene terephthalate (PET) in which not less than 80 mol % of the structural units is constituted by ethylene terephthalate, polyethylene-2,6-naphthalate (PEN) in which not less than 80 mol % of the structural units is constituted by ethylene-2,6-naphthalate, poly-1,4-cyclohexanedimethylene terephthalate (PCT) in which not less than 80 mol % of the structural units is constituted by 1,4-cyclohexanedimethylene terephthalate, polyethylene isophthalate, and poly-1,4-butyrene terephthalate (PBT).

As the copolymer materials other than the said primary constituent, there can be used diols such as propylene glycol, 1,3-butylene glycol, 2,3-butylene glycol, neopentyl glycol, trimethylene glycol, tetramethylene glycol, hexamethylene glycol, diethylene glycol, triethylene glycol, polyethylene glycol, polytetramethylene glycol and polyalkylene glycol; isophthalic acid, 2,7-naphthalenedicarboxylic acid, 5-sodiumsulfoisophthalic acid, oxalic acid, malonic acid, succinic acid, adipic acid, azelaic acid, sebacic acid, diphenyl ether dicarboxylic acid, oxymonocarboxylic acid, and their ester-forming derivatives.

The polyesters usable in the present invention include homopolymers, copolymers and their blends with a small proportion of other resins.

The polyester film support used in the present invention is biaxially oriented, and it may contain a projection forming agent such as added particles, precipitated particles, catalyst residue, etc., which, when contained in the film, can impart preferable slip properties to the film. The type, size and amount of the projection forming agent may be properly selected according to the required slipperiness and transparency of the film. For instance, in order to provide a required haze with the restricted film thickness in the present invention, it is suggested to contain at least one type of particles having an average size (diameter) of not more than 5 $\mu$m, preferably not more than 3 $\mu$m, in an amount of not more than 1% by weight, preferably not more than 0.5% by weight, in the case of the added particles.

The polyester film support may also contain, if necessary, other additives such as antistatic agent, stabilizer, lubricant, crosslinking agent, anti-blocking agent, antioxidant, UV absorber, etc.

In the present invention, the polyester film support may have a multilayer structure, in which case part of the layers may comprise a polymer or polymers other than polyesters.

The primer coated polyester film according to the present invention has a priming layer (with excellent adhesion for aqueous coatings and easily adherable) on at least one side of the biaxially oriented polyester film, the said priming layer having been oriented at least monoaxially. Stretching of this resin layer is conducive to the uniformity of layer thickness and the improvement of adhesion and transparency.

The primer coated polyester film of the present invention is preferable for use as a support for the imaging media, and its thickness ranges from 40 to 200 $\mu$m. If the thickness is less than 40 $\mu$m, the film have lack the strength required for the support. A film thickness exceeding 200 $\mu$m is more than necessary in practical use and detrimental to economy.

It is also notable that the primer coated polyester film of the present invention is low in haze. High haze of the primer coated polyester film leads to the problems such as reduced distinction of the projected image on OHP and restricts the scope of use of the film. Specifically, the film haze needs to be not more than 5%, preferably not more than 3%.

Regarding transparency of the film, it is preferable that the overall light transmittance of the laminated film is in a high percent range, specifically not less than 80%, preferably not less than 85%, even more preferably not less than 88%, for the same reason as in the case of film haze mentioned above.

The important feature of the present invention resides in that the priming layer of the said laminate film is formed by using a coating solution containing (A) a water-soluble resin having vinyl alcohol units as main constituent and (B) a water-soluble or water-dispersible resin having aromatic polyester unit. More specifically, it is essential for the laminated film of the present invention to have a priming layer formed by applying the said coating solution on at least one side of the support film and drying it, the thus formed layer being oriented at least monoaxially.

As the water-soluble resin (A) having the vinyl alcohol units as main constituent, it is possible to use polyvinyl alcohols which can be obtained through ordinary synthetic reactions or the compounds obtained by applying a partial modifying treatment such as acetalization or butyralization on the said polyvinyl alcohols. The resins (A) used in the present invention are not specifically defined except that they are water-soluble. The polymerization degree of the resins (A) is also not specified, but it is usually not less than 100, preferably 300 to 40,000. If the polymerization degree is less than 100, the formed priming layer may be too low in water resistance.

The saponified products of polyvinyl acetate having a saponification degree of 70 to 99.9 mol % are practically used as the resin (A). The preferred range of saponification degree is 70 to 95 mol %.

The resin (A) used in the present invention may be a resin obtained by copolymerizing a low-molecular weight compound having a polymerizable unsaturated functional group such as acrylic vinyl group in the ordinary polyvinyl alcohol units mentioned above, or a resin obtained by copolymerizing a low-molecular weight compound having polymerizable unsaturated functional groups such as vinyl acetate and acrylic vinyl group, and further subjecting the product to a deacetation treatment, as far as the main constituent of such resin is vinyl alcohol units.

The water-soluble or water-dispersible resins (B) having an aromatic polyester unit and usable in the present invention can be selected from those prepared to be used as water dispersions by the conventional methods. These resins (B) can be synthesized from the ordinary polycondensation reactions using as starting materials a polyvalent carboxylic acid whose main constituent is an aromatic dicarboxylic acid compound and a polyvalent hydroxyl compound whose main constituent is an aliphatic diol compound. The amounts of aromatic dicarboxylic acid compound and aliphatic diol compound are preferably not less than 60 mol % based on 100 mol % of polyvalent carboxylic acid and polyvalent hydroxyl compound, respectively.

The polyvalent carboxylic acids usable in the present invention include aromatic dicarboxylic acids such as terephthalic acid, isophthalic acid, orthophthalic acid, phthalic acid, 4,4'-diphenyldicarboxylic acid, 2,5-naphthalenedicarboxylic acid and 2,6-naphthalenedicarboxylic acid, aromatic tricarboxylic acids such as trimellitic acid, trimesic acid and trimellitic anhydride, aliphatic dicarboxylic acids such as sebacic acid, dodecanedicarboxylic acid, glutaric acid, succinic acid and phthalic anhydride, and ester-forming derivatives thereof.

For the aromatic dicarboxylic acid compounds, it is preferable that at least one of terephthalic acid, isophthalic acid, 2,6-naphthalenedicarboxylic acid and their ester-forming derivatives is selected as the main constituent.

The polyvalent hydroxyl compounds usable in the present invention include aliphatic diols such as ethylene glycol, 1,2-propylene glycol, 1,3-propylene glycol, 1,3-propanediol, 1,4-propanediol, 1,6-hexanediol, 2-methyl-1,5-pentanediol, neopentyl glycol, 1,4-cyclohexanedimethanol, diethylene glycol, triethylene glycol, polyethylene glycol, polypropylene glycol, polytetramethylene glycol, polytetramethylene oxide glycol, dimethylolpropionic acid, glycerin and trimethylolpropane, and aromatic diols such as p-xylylene glycol and bisphenol A-ethylene glycol adduct.

For the aliphatic diol compounds, it is preferable that at least one of ethylene glycol, diethylene glycol, 1,4-butanediol, neopentyl glycol, 1,4-cycohexanedimethanol and their ester-forming derivatives is selected as the main constituent.

The resin (B) used in the present invention may be a polyester polyurethane obtained by reacting a diisocyanate or the like with the terminal group of an aqueous polyester comprising the said constituents to effect urethane modification, or an acryl and/or vinyl graft polyester obtained by polymerizing an addition polymerizable compound having acrylic or vinyl-based unsaturated double bonds, in the presence of an aqueous polyester.

The resin (B) is preferably of the type in which an ionic functional group has been introduced into the molecule for improving water dispersibility. The ionic functional group to be introduced into the molecule in this system is preferably an anionic group comprising a carboxylic acid, sulfonic acid, phosphoric acid or a salt thereof in view of dispersion stability. In order to enhance cohesive force of the priming layer, it is preferable that the resin (B) is a polyester in which the functional group comprising a carboxyl group or a salt thereof has been turned mostly into an aqueous form. The method for introducing an ionic functional group into the molecule of the aqueous polyester is not specified in the present invention; it is, for instance, possible to use a method in which a compound having a sulfonic group or a salt thereof, or a tri to tetrafunctional carboxylic acid or its ester-forming derivative is used as a copolymer material, and a method in which urethane modification or acrylic vinyl modification is affected by using a modifying compound having an ionic functional group.

The resin (B) used in the present invention is preferably a copolyester comprising the structural units defined above. The average molecular weight (determined by GPC) of the resin (B) is not specified, but it is usually not less than 5,000, preferably not less than 8,000. If the average molecular weight of the resin (B) is less than 5,000, the priming layer tends to deteriorate in water resistance and adhesion to the functional layers. The glass transition temperature (Tg) of the resin (B) is preferably not less than 20° C., more preferably not less than 30° C., even more preferably not less than 40° C. If Tg of the resin (B) is less than 20° C., the priming layer may be unable to have satisfactory anti-block properties. The upper limit of Tg of the resin (B) is preferably 140° C. If Tg of the resin (B) exceeds 140° C., the priming layer may lack sufficient stretchability when it is oriented with the base polyester film in the stretching step.

In the present invention, it is preferred to additionally use a low-molecular weight compound (C) having a bi- or higher-order multi-functional crosslinkable group. By using a compound such as a melamine compound having at least one of methylol group, methoxymethyl group, alkoxymethyl group and imino group having reactivity with the alcoholic hydroxyl group of the resin (A), an epoxy compound having a glycidyl group, an isocyanate compound having a blocked isocyanate group, or a metal alcoxide containing Ti, Zr or Al, it is possible to improve cohesive force of the priming layer as well as its water and solvent resistance. By this effect, the said resin layer is not affected by the solvent used in the coating solution for forming a functional layer on the resin layer and is capable of showing high adhesion.

The crosslinkable compound (C) may be a single compound selected from those shown above, but it is also possible to use a combination of these crosslinkable compounds. For instance, a combination of an epoxy compound having the glycidyl and hydroxyl groups and a melamine compound having at least one of methyl group and methoxymethyl group, or a combination of an epoxy compound having the glycidyl and hydroxyl groups and an isocyanate compound having a blocked isocyanate group can be used.

The presence of at least one crosslinkable compound (C) having many reactive functional groups in the molecule contributes to elevating crosslinking efficiency to realize easy improvement of water resistance, solvent resistance and adhesion of the priming layer.

The most preferred example of the crosslinkable compound (C) having many reactive functional groups in the molecule is melamines having a methylol or methoxymethyl group. As the melamines having a methylol or methoxymethyl group, there are generally known the compounds having a tri- to hexa-functional methylol or methoxymethyl group, but hexa-functional methylolmelamine and methoxymethylmelamine are especially preferred as they provide the most efficient effect of improvement.

Also, in the priming layer of the film of the present invention are preferably contained the inactive particles for improving anti-block properties and slip characteristics of the film surface.

The inactive particles usable in the present invention include both inorganic and organic types. Examples of the inorganic inactive particles are silica sol, alumina sol, calcium carbonate and titan oxide. Examples of the organic inactive particles include the fine particles comprising a single or copolymer of polystyrene resin, polyacrylic resin, polyvinyl resin or the like, and the organic particles represented by the crosslinked particles combining the said fine particles and a crosslinking agent. The softening or decomposition temperature of these inactive particles is preferably not less than 200° C., more preferably not less than 250° C., even more preferably not less than 300° C.

The size (diameter) of the inactive particles in the priming layer is preferably so selected that the ratio of the average diameter (d; μm) of the particles to the average thickness (L; μm) of the priming layer (d/L) is within the range of 1/3 to 3/1, preferably 1/2 to 3/1.

The mixing ratios of the resin (A), resin (B) and crosslinkable compound (C) contained in the coating solution used for forming the priming layer in the present invention preferably is in the range where the following formulas (1) and (2) are satisfied at the same time:

$$1/9 \leq (A)/(B) \leq 9/1 \quad (1)$$

$$1/1 \leq \{(A)+(B)\}/(C) \leq 100/1 \quad (2)$$

In case where the crosslinkable compound (C) comprises a combination of two or more compounds, the total amount thereof is supposed to be equivalent to the value of (C) in the above formula (2).

When the component resin (B) is too small in content, sufficient adhesion to the base polyester film may not be obtained. It is preferable that the resin (B) content is not less than 10 parts by weight for providing the priming layer with desired adhesion.

A too small content of the resin (A) results in unsatisfactory adhesion of the priming layer to the functional layers comprising hydrophilic resins. The resin (A) content is preferably not less than 10 parts by weight for imparting satisfactory adhesion to the priming layer.

It is preferable that the crosslinkable compound (C) is contained in an appropriate ratio in the coating solution comprising a mixture of the components (A) and (B) for improving adhesion, particularly adhesion with water resistance and anti-block properties. When the content of the crosslinkable compound (C) is too high, adhesion of the priming layer may be adversely affected.

The priming layer according to the present invention may further contain a small quantity of a water-soluble or water-dispersible binder resin other than the resins (A) and (B) mentioned above, as required. Examples of such binder resins usable in the present invention include polyurethane resins, acrylic resins, vinyl resins, epoxy resins and amide resins. The skeletal structure of these binder resins may be substantially a composite structure provided by copolymerization or other treatments. Examples of the binder resins having a composite structure include acrylic resin-modified polyesters, acrylic resin-modified polyurethanes, vinyl resin-modified polyesters and vinyl resin-modified polyurethanes.

In the priming layer of the film according to the present invention, a small quantity of a crosslinking-reactive compound other than those mentioned above may also be contained as required. Such a crosslinking-reactive compound undergoes a crosslinking reaction primarily with the functional group of the resin contained in the priming layer to further improve cohesiveness, surface hardness, scuff resistance, solvent resistance and water resistance of the priming layer. The crosslinking-reactive compound used in the present invention may be either a low-molecular weight compound or a high polymer having a reactive functional group as far as a bi- or higher-order multifunctional reactive group is contained in the molecule.

The priming layer of the film of the present invention may contain, if necessary, small quantities of additives such as surfactant, defoaming agent, coating properties improver, thickener, low-molecular antistatic agent, organic lubricant, antioxidant, UV absorber, foaming agent, dye, pigment, etc. These additives may be used either singly or in combination as required.

The priming layer may be formed either on one side alone or on both sides of the base polyester film. In case where the said layer is formed on one side alone of the base film, a layer different from the priming layer may be formed on the opposite side of the film so as to impart additional properties to the support for imaging media (such as recording sheets) of the present invention. A chemical treatment or a physical treatment such as discharge treatment may be conducted on the film before coating to improve the film coating properties and adhesion of the coating solution to the film. Also, in order to further improve surface properties of the polyester film for imaging media of the present invention, a physical treatment such as discharge treatment may be performed after formation of the priming layer.

The thickness of the priming layer is usually in the range of 0.01 to 2 μm, preferably 0.02 to 0.5 μm, more preferably 0.03 to 0.2 μm. When the thickness of the said layer is less than 0.01 μm, preferred adhesion may not be obtained, and when the thickness exceeds 2 μm, anti-block properties may not be sufficient.

The known methods can be used for producing the biaxially oriented polyester film used as support. For example, a method can be used which comprises mixing the dry polyester chips and the necessary additives in a hopper, supplying the mixture to an extruder from the hopper, melt kneading the mixture by the extruder at 200 to 300° C., extruding it into a sheet from a die, rapidly cooling the extrudate on a casting drum (rotary cooling drum) of about 70° C. or below to obtain an amorphous sheet, stretching this sheet 4 times or more, preferably 9 times or more in area in the machine and/or transverse directions, and heat setting the oriented film at 120 to 200° C.

Formation of the priming layer on the surface of the biaxially oriented polyester film is achieved by coating in the present invention. A method is preferably used in which a coating solution of a priming is applied in the polyester film producing process. More specifically, the following methods can be used: a coating solution capable of forming a priming layer is applied on the surface of an amorphous sheet and dried; a coating solution for forming a priming layer is applied on the surface of a monoaxially oriented film and dried; a coating solution for forming a priming layer is applied on the surface of a biaxially oriented film and dried. Of these methods, the one in which a coating solution for forming a priming layer is applied on the surface of an amorphous or monoaxially oriented film and the laminated film is subjected to a heat treatment while simultaneously drying and curing the coat, is most economical. In any way, the formed priming layer is oriented at least monoaxially.

It is possible to use, if necessary, a combination of some of the said coating methods. For instance, a process may be used in which a coating solution for forming a first layer is applied on the surface of an amorphous sheet and dried, and after uniaxial drawing, a coating solution for forming a second layer is applied thereon and dried. In this case, the object of the present invention can be attained if this film is a laminated film in which the layer forming the film surface is a priming layer according to the present invention.

Various coating means such as reverse roll coater, gravure coater, rod coater, air doctor coater, etc., described in, for instance, Yuji Harasaki: Coating Systems, Maki Shoten, 1979, can be used for applying a coating solution of a priming on the surface of a polyester film.

The coating solution used for forming the priming layer in the present invention is usually prepared using water as main medium for the reason of safety and hygienic consideration. As far as water is used as main medium, a small quantity of an organic solvent may be contained in the coating solution for the purpose of improving water dispersibility or enhancing film-forming performance. The amount of such an organic solvent, when used by mixing it with water which is the main medium, should be within the range where the solvent can be entirely dissolved in water. It is possible to use a single organic solvent or a mixture of two or more different types of organic solvent as required.

According to the present invention, as described above, there is provided a laminated film which shows excellent adhesion in all applications where a layer containing an aqueous resin such as polyvinyl alcohol is used as a functional layer for bar code labels, magnetic cards, graphic arts, etc., for instance, OHP films, labels, plotter films, photographic films, photographic printing paper films, etc.

EXAMPLES

The present invention is described in further detail with reference to the examples thereof, but it should be understood that these examples are merely intended to be illustrative and not to be construed as limiting the scope of the invention in any way. The determination methods and definitions of the properties and characteristics of the film according to the present invention are as described below. In the following Examples and Comparative Examples, all "parts" and "percent (%)" are by weight unless otherwise noted.

(1) Aqueous Resin Adhesion An aqueous resin polyvinyl acetal (S-LEC KX-1, hereinafter referred to as KX1, produced by Sekisui Chemical Co., Ltd.), adjusted to an 8 wt % concentration, was coated on the priming layer surface by a Baker's applicator to a coating thickness immediately after coating of approximately 127 μm and dried. After coating, the film was immediately heated in an oven at 100° C. for 4 minutes to dry the coat. Black-color printing was conducted on the dried KX1-coated surface (in the square of 12 cm×12 cm) by an ink jet printer (Cannon BJC-600J) and air-dried for about 12 hours (at 23° C. and 50% RH). An adhesive tape (Nichiban Cellotape, 18 mm wide) was pasted to the printed surface and quickly peeled off, visually observing the post-peeling condition.

The printed surface was crosscut into 100 squares at intervals of 1 mm, and an adhesive tape (Nichiban Cellotape, 18 mm wide) was pasted thereon and quickly peeled off, visually observing the post-peeling condition.

The result of visual observation was evaluated according to the following criterion:

○ (good): Peeled less than 20%.

Δ (fair): Peeled 20 to not more than 80%.

X (poor): Peeled 80% or more.

(2) Film Haze

Film haze was measured by an Ulbricht sphere hazeometer NDH-20D (mfd. by Nippon Denshoku Kogyo KK) according to JIS-K6714 and evaluated according to the following criterion:

○ (good): Film haze was less than 3%.

Δ (fair): Film haze was 3 to less than 5%.

X (poor): Film haze was 5% or above.

(3) Anti-block Properties

The priming layer surface of an easily adherable polyester film was placed on a non-treated PET film, or the priming layer surfaces of the two easily adherable polyester films were placed one on the other, and they were pressed under a load of 10 kg/cm$^2$ at 40° C. and 80% RH for 20 hours and the degree of blocking was measured from the load needed for peeling the pressed film surface according to ASTM D-1893. Measurements were evaluated according to the following criterion:

○ (good): Load was less than 50 g.

Δ (fair): Load was 50 to not more than 200 g.

X (poor): Load was 200 g or greater.

The materials (binder resin, etc.) used for forming the priming layer in the Examples and Comparative Examples are described as follows.

(1) PVA Resin A

Comprising a polyvinyl alcohol having a saponification degree of 88 mol % and a polymerization degree of 500.

(2) Aqueous Polyester B

Obtained by copolymerizing neopentyl glycol and a dicarboxylic acid derivative having an aliphatic dicarboxylic anhydride with a polyester mainly comprising isophthalic acid, ethylene glycol and diethylene glycol, neutralizing the produced polyester with an amine compound, and turning it into an aqueous form.

(3) Crosslinkable Compound C1
   Hexamethoxymethylmelamine
(4) Crosslinkable Compound C2
   Polyethylene glycol diglycidyl ether (n=22)
(5) Inactive Particles D
   Silica sol having an average particle size of 65 nm
(6) Aqueous Binder Resin E
   An aqueous acrylic copolymer resin obtained by copolymerizing acrylic acid, ethyl acrylate and a methacrylic acid amide with an acrylic resin primarily comprising methyl methacrylate.

Example 1

After carrying out an ester exchange reaction by a conventional method, the silica particles with an average size of 2 μm dispersed in ethylene glycol were added. Then a polycondensation reaction was conducted according to a conventional method to obtain polyethylene terephthalate having an inherent viscosity of 0.65. This polyethylene terephthalate was melt extruded at 280 to 300° C. and cast onto a cooling drum using a static pinning technique to form an approximately 720 μm thick amorphous film. This film was stretched 3.7 times in the machine direction at 85° C. Then a coating solution containing 3.15 parts of the PVA resin A, 3.15 parts of the aqueous polyester B, 0.35 part of the crosslinkable compound C1 and 0.35 part of the inactive particles (silica sol D) was coated on one side of the film, and this film was stretched 3.9 times in the transverse direction at 100° C. and then heat treated at 210° C. to obtain a 50 μm thick biaxially oriented polyester film. The content of the silica particles in the film was about 60 ppm.

Examples 2–10 and Comparative Examples 1–5

The same procedure as defined in Example 1 was conducted except that the priming layer composition was changed as shown in Table 1.

TABLE 1

|  | Ex. 1 | Ex. 2 | Ex. 3 | Ex. 4 | Ex. 5 |
|---|---|---|---|---|---|
| PVA resin (A) | A = 3.15 | A = 2.98 | A = 2.63 | A = 2.28 | A = 1.93 |
| Aqueous resin (B · E) | B = 3.15 | B = 2.98 | B = 2.63 | B = 2.28 | B = 1.93 |
| Crosslinkable resin (C) | C1 = 0.35 | C1 = 0.7 | C1 = 1.4 | C1 = 2.1 | C1 = 2.8 |
| Inactive particles (D) | D = 0.35 | D = 0.35 | D = 0.35 | D = 0.35 | D = 0.35 |
| Coating thickness (L) (μm) | 0.05 | 0.05 | 0.05 | 0.05 | 0.05 |
| d/L | 1.3 | 1.3 | 1.3 | 1.3 | 1.3 |

|  | Ex. 6 | Ex. 7 | Ex. 8 | Ex. 9 | Ex. 10 |
|---|---|---|---|---|---|
| PVA resin (A) | A = 2.98 | A = 2.8 | A = 2.45 | A = 2.63 | A = 3.33 |
| Aqueous resin (B · E) | B = 2.98 | B = 2.8 | B = 2.45 | B = 2.63 | B = 3.33 |
| Crosslinkable resin (C) | C1 = 0.35 C2 = 0.35 | C1 = 0.35 C2 = 0.7 | C1 = 0.35 C2 = 1.4 | C2 = 1.4 | — |
| Inactive particles (D) | D = 0.35 | D = 0.35 | D = 0.35 | D = 0.35 | D = 0.35 |
| Coating thickness (L) (μm) | 0.05 | 0.05 | 0.05 | 0.05 | 0.05 |
| d/L | 1.3 | 1.3 | 1.3 | 1.3 | 1.3 |

TABLE 1-continued

|  | Comp. Ex. 1 | Comp. Ex. 2 | Comp. Ex. 3 | Comp. Ex. 4 | Comp. Ex. 5 |
|---|---|---|---|---|---|
| PVA resin (A) | A = 6.65 | — | — | A = 2.28 | A = 1.58 |
| Aqueous resin (B · E) | — | B = 6.65 | E = 6.65 | E = 2.28 | B = 1.58 |
| Crosslinkable resin (C) | — | — | — | C1-2.1 | C1 = 3.5 |
| Inactive particles (D) | D = 0.35 | D = 0.35 | D = 0.35 | D = 0.35 | D = 0.35 |
| Coating thickness (L) (μm) | 0.05 | 0.05 | 0.05 | 0.05 | 0.05 |
| d/L | 1.3 | 1.3 | 1.3 | 1.3 | 1.3 |

The results of evaluation of the primed films according to Examples 1 to 10 and Comparative Examples 1 to 5 are shown in Table 2.

TABLE 2

|  | Adhesion | | Transparency | Anti-block properties | |
|---|---|---|---|---|---|
|  | 1 | 2 |  | 1 | 2 |
| Example 1 | ○ | ○ | ○ | ○ | Δ |
| Example 2 | ○ | ○ | ○ | ○ | ○ |
| Example 3 | ○ | ○ | ○ | ○ | ○ |
| Example 4 | ○ | Δ | ○ | ○ | ○ |
| Example 5 | ○ | Δ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | Δ |
| Example 10 | ○ | Δ | ○ | Δ | X |
| Comp. Example 1 | X | X | ○ | Δ | X |
| Comp. Example 2 | X | X | ○ | X | X |
| Comp. Example 3 | X | X | ○ | ○ | ○ |
| Comp. Example 4 | X | X | ○ | ○ | ○ |
| Comp. Example 5 | Δ | X | ○ | ○ | ○ |

*"Adhesion 1 and 2" and "Anti-block properties 1 and 2" are the results of evaluation under the following conditions:
Adhesion 1: evaluation of the coated surface of the inkjet printed image receiving layer
Adhesion 2: evaluation of the black solid printed surface of the ink jet printed image receiving layer
Anti-block properties 1: between the easy-adhesion treated surface and the non-treated surface
Anti-block properties 2: between the easy-adhesion treated surfaces

What is claimed is:
1. A primer coated polyester film for imaging media, which has a thickness of 40 to 200 μm and a haze of not more than 5%, and comprises a biaxially oriented polyester film support and at least one priming layer having a thickness of 0.01 to 0.2 μm, which priming layer is laminated directly on said support and oriented at least monoaxially, said priming layer being formed from a coating solution containing a water-soluble resin (A) having a polyvinyl alcohol unit as a main constituent and a water-soluble or water-dispersible resin (B) having at least one aro- matic polyester unit, and further containing a crosslinkable compound (C) having a multifunctional crosslinkable group, wherein the weight ratios of (A), (B) and (C) in the coating solution satisfy the following formulas (1) and (2) at the same time:

$$1/9 \leq (A)/(B) \leq 9/1 \quad (1),$$

and $$1/1 \leq \{(A)+(B)\}/(C) \leq 100/1 \quad (2).$$

2. A primer coated polyester film according to claim 1, wherein the crosslinkable compound (C) is a melamine compound having at least one of methylol group and methoxymethyl group.

3. A primer coated polyester film according to claim 1, wherein the priming layer contains inactive particles, and the ratio of average diameter (d; $\mu$m) of said inactive particles to the thickness (L; $\mu$m) of priming layer (d/L) is 1/3 to 3/1.

4. A primer coated polyester film according to claim 1, wherein the resin (B) has a functional group comprising a carboxyl group or a salt thereof.

* * * * *